United States Patent Office 2,740,741
Patented Apr. 3, 1956

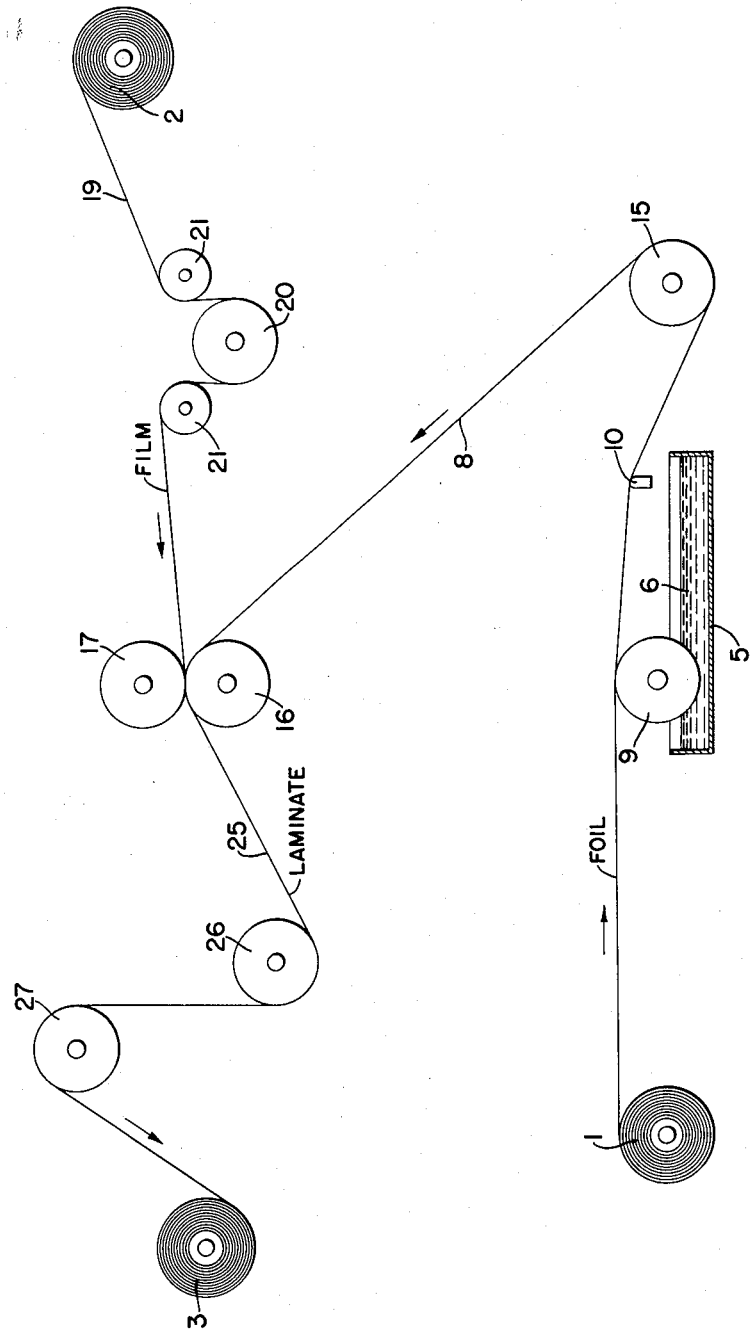

2,740,741

STRETCHING AND LAMINATING THERMO-STRETCHABLE FILM

Paul J. Vaughan, Cuyahoga Falls, and Norman W. Hockett, Akron, Ohio, assignors, by mesne assignments, to The Goodyear Tire & Rubber Company, a corporation of Ohio Application September 15, 1953, Serial No. 380,274

2 Claims. (Cl. 154—124)

This invention relates to the stretching of thermo-stretchable film and its substantially simultaneous lamination to sheet material to produce a laminate suitable for packaging, etc.

Laminations of heat-sealable film to sheet material such as paper, cellophane, metal foils, etc. are common in the art. The film makes the laminate heat sealable and imparts other desirable properties to it. For example, laminations of heat-sealable film and foil render the foil more impervious to the passage of gases, strengthens the foil, and improve its folding endurance.

The laminates of this invention are formed of stretched film and the material cost is less, and may be appreciable less than the cost of laminates produced from unstretched film. In the laminates made from unstretched film, the film is often thicker than is necessary or desirable, so the laminate made with the thinner stretched film is not only cheaper than that made with the unstretched film, but also has improved properties such as greater flexibility, etc.

The thermo-stretchable and heat-sealable films used in producing laminates according to this invention include, for example, rubber hydrochloride films, polyethylene films, and the vinyl films (including polymers of vinyl chloride and copolymers thereof), etc.

The sheet material to which the stretched film is laminated is a packaging material and may be metal foil or other foils, and may be kraft paper, glassine paper, parchment paper, cellophane, chip board, fabric, etc., and may even be thermo-stretchable, but in that event, care must be taken to prevent stretching or shrinkage of the hot, freshly laminated product. Three or more plies, including one stretchable film, may be laminated to one another. For instance, film from two supply rolls may be laminated to opposite surfaces of foil or other sheet material, and may be stretched as herein described, substantially simultaneously with the laminations.

The adhesive employed is preferably a meltable adhesive. A lacquer adhesive may be used in which case the solvent is preferably entirely evaporated before the stretched film is brought into contact with it. The selection of the adhesive will depend to some extent upon the temperature at which the film is stretchable. The adhesive may be a natural composition, or it may be synthetic. Waxes have been used to large extent for laminations, and wax is the preferred adhesive used in the process of this invention. Microcrystalline waxes are preferred. They are free from odor and taste, and are not attacked by the solvents ordinarily present in packaged goods. Microcrystalline waxes which have been found satisfactory for producing laminates with rubber hydrochloride film are those known commercially as Socony-Vacuum 2305, Socony-Vacuum 2310, Socony-Vacuum Magnawax, Warco 150A Yellow, Bareco Be Square (melting point 170 to 175) and Bareco Victory Wax (165 Amber). Any microcrystalline wax of petroleum origin which is soft to the touch and has the proper melting point may be employed. The tack of the wax may be improved by adding a tackifier such as polyisobutylene, etc. If a lacquer adhesive is employed it may have a butyl-rubber or butadiene-styrene-polymer base. Various suitable lacquer adhesives are available on the market.

The selection of the adhesive will depend upon the use which is to be made of the laminate. For instance, a laminate which is to be used for packaging frozen foods should retain its flexibility at low temperatures.

The chief value of the invention lies in its simplicity and the efficient manner of stretching substantially simultaneously with the lamination. Thermo-stretchable films are unstable at high temperatures, and tend to shrink to their original dimensions. Moreover, the films have certain stretching idiosyncracies. For instance, films such as rubber hydrochloride tend to narrow or "neck down" if a long- unsupported span of the film is subjected to stretching.

In stretching thermo-stretchable film, one ordinarily avoids having the stretched film still hot when the stretching rolls contact it. This is one unusual feature of this invention: the film is stretched substantially simultaneously with the lamination operation. Ordinarily the stretching occurs immediately before the film enters the bite of the laminating rolls, although the film may be stretched at the bite or even immediately afterward. The adhesive sets soon after leaving the laminating rolls, so that although the film is still hot enough to be stretched or to shrink, it is laminated to a material of unchangeable dimensions. This prevents undesirable stretching or shrinkage or other distortion of the film.

If a film such as rubber hydrochloride film is stretched so long before its lamination that it cools and must be reheated for the lamination, it tends to shrink and become distorted when subjected to such subsequent heating. Therefore, according to this invention the film is heated and stretched substantially simultaneously with the lamination. This film is hot and stretchable and also shrinkable as it passes through the laminating rolls, and could be handled only with difficulty after passing through the rolls, except for its lamination to sheet material which has dimensional stability. The lamination is carried out while the film is still hot enough to be stretched, and the heat for the stretching may come from the lamination mechanism, or from heating bulbs located in a row or rows adjacent the film immediately before or after its lamination, or from some equivalent source.

The heat for the stretching preferably comes, at least primarily, from the heated roll or rolls used for the lamination. The film approaches these rolls very rapidly, consequently it is not softened or stretched until immediately before it passes between them. It is not necessary that both rolls be heated. For instance, a molten adhesive may be used, with only one of the two rolls being heated, and preferably the metal foil will contact the heated roll. The molten adhesive is maintained as a bank in the bite of the rolls. The foil and molten adhesive convey enough heat to bring the film to the stretching temperature before it touches the adhesive, or it may be stretched while in contact with the adhesive.

The invention will be further described in connection with the stretching of rubber hydrochloride film and its lamination to aluminum foil, using molten wax. However, it is to be understood that in its broader aspects the invention is not limited thereto, and this preferred operation is disclosed as illustrative of the invention.

The drawing illustrates somewhat conventionally an elevational view of equipment used for the stretching and lamination. The aluminum foil is supplied from the supply roll 1. The rubber hydrochloride film is supplied from the supply roll 2. The laminated sheet is rolled up on the wind-up roll 3.

Rubber hydrochloride film is ordinarily stretched at about 200° F. For such film Magnawax (above) or other microcrystalline wax of petroleum origin with a melting point of 145 to 175° F. has been found satisfactory. The wax was contained in the wax bath 5 which was heated by coils (not shown). The molten wax is illustrated at 6. It was applied to the under surface of the foil 8 by the pick-up roll 9. Excess molten wax was removed from the foil by the doctor blade 10. The foil was coated on one side with the molten wax, and then passed over the guide roll 15 to the bite rolls 16 and 17 which served both for stretching the film and laminating it to the foil. These rolls were heated with steam to 212° F.

The rubber hydrochloride film 19 was drawn from the supply roll 2 by the driven roll 20. Guide rolls 21 increase the area of contact between the film and the roll 20, and thus prevent slippage of the film on the surface of the roll.

After passing through the heated bite rolls 16 and 17 the laminate 25 was drawn over the cold rolls 26 and 27 where the adhesive was hardened. The laminate was then rolled up on the wind-up 3.

The rolls 9, 15, 16, 17, 26 and 27 were all driven at the same speed, and the wind-up roll 3 was driven at a constant surface speed equivalent to the above-mentioned rolls. The roll 20 was also driven, but was driven at a speed only one-fourth of the speed of the rolls 16 and 17. The film 19 entering these rolls was heated by heat conveyed from them. Likewise the temperature of the molten wax on the foil as it entered the bite rolls was sufficient to convey some heat to the film before the two were brought into contact. The speed of the roll 20 being only one-fourth of the speed of the rolls 16 and 17, the heated and softened film was stretched to four times its original length substantially simultaneously with the lamination.

As the film and foil were drawn through the bite of the rolls 16 and 17, sufficient pressure was applied to laminate the film to the foil by the molten wax. After leaving the laminating rolls the heated and stretched film was supported by the foil and its dimensions maintained by the foil to which it was adhered. The laminate was passed over the cooling rolls 26 and 27, and the cooling was preferably sufficient to rapidly solidify the wax.

In one operation rubber hydrochloride film containing 10 parts of butyl stearate was used, and this was stretched to a gauge of 0.00025 inch. This was laminated to aluminum foil of 0.0005 inch. In this lamination the wax was about 0.00015 inch thick. (The gauge of the wax can be adjusted by controlling the pressure between the bite rolls.) This laminate had a drop height of 11 inches at each of the temperatures 0° F., 38° F. and 77° F. Its tensile strength measured in pounds per square inch was 5580 across the laminate and 7250 longitudinally of the laminate. Moisture vapor determinations were made on unfolded laminate and laminate folded in 1-inch squares, and it was found that the moisture vapor transfer rate in grams per 100 square inches for 24 hours was zero for the unfolded laminate and 0.089 for the folded laminate.

The nature of the laminate will be varied depending upon the use to which it is to be put. Laminates having widely different properties may be made from different films such as polyethylene, rubber hydrochloride, the vinyl films, etc., differently plasticized, etc., sheet materials such as the different varieties of paper, including glassine, etc., and the different foils including lead foil, etc. One or both of the plies being laminated may be fed directly into the bite of the laminating rolls from the supply rolls to minimize the likelihood of a ply becoming wrinkled. In that case the adhesive is advantageously supplied directly to a bank maintained at the line where the film and foil come into contact, as by dropping melted adhesive on to the bank. The properties of the product may be changed by varying the composition or thickness of the film or sheet or the adhesive employed.

The invention is defined in the appended claims.

What we claim is:

1. The method of stretching and laminating thermostretchable film to sheet material, which comprises supplying adhesive to a surface of at least one of them, moving the film and the sheet through the bite of pressure rolls where the film is laminated to the sheet by the adhesive, supplying the sheet to the rolls at the rate the laminate is delivered from the rolls, and supplying the film to the rolls over a feed roll which has a slower surface speed than said pressure rolls, and softening the film by heat as it enters the bite of the pressure rolls and stretching it as it passes from the feed roll to the pressure rolls whereby it is stretched substantially simultaneously with the lamination.

2. The method of stretching and laminating thermostretchable film to a sheet material of stable dimensions suitable for packaging, which comprises rotating a pair of laminating rolls under pressure, supplying the sheet material into the bite of the rolls at the rate the laminate is delivered from them, supplying the film into the bite of the laminating rolls from a feed roll which has a slower surface speed than said laminating rolls, supplying heat to at least one of the laminating rolls and by said heat heating the film to the softening temperature immediately before it enters the bite of the rolls, whereby the film is stretched as it enters the bite of the rolls, and while the film is still hot laminating it to the sheet material by applying molten wax to the surface of at least one of said film and said sheet material.

References Cited in the file of this patent

UNITED STATES PATENTS

| | | |
|---|---|---|
| 2,259,362 | Young | Oct. 14, 1941 |
| 2,286,569 | Pollack | June 16, 1942 |